No. 621,083. Patented Mar. 14, 1899.
B. C. HICKS.
VEHICLE.
(Application filed Aug. 8, 1898.)
(No Model.) 2 Sheets—Sheet 2.
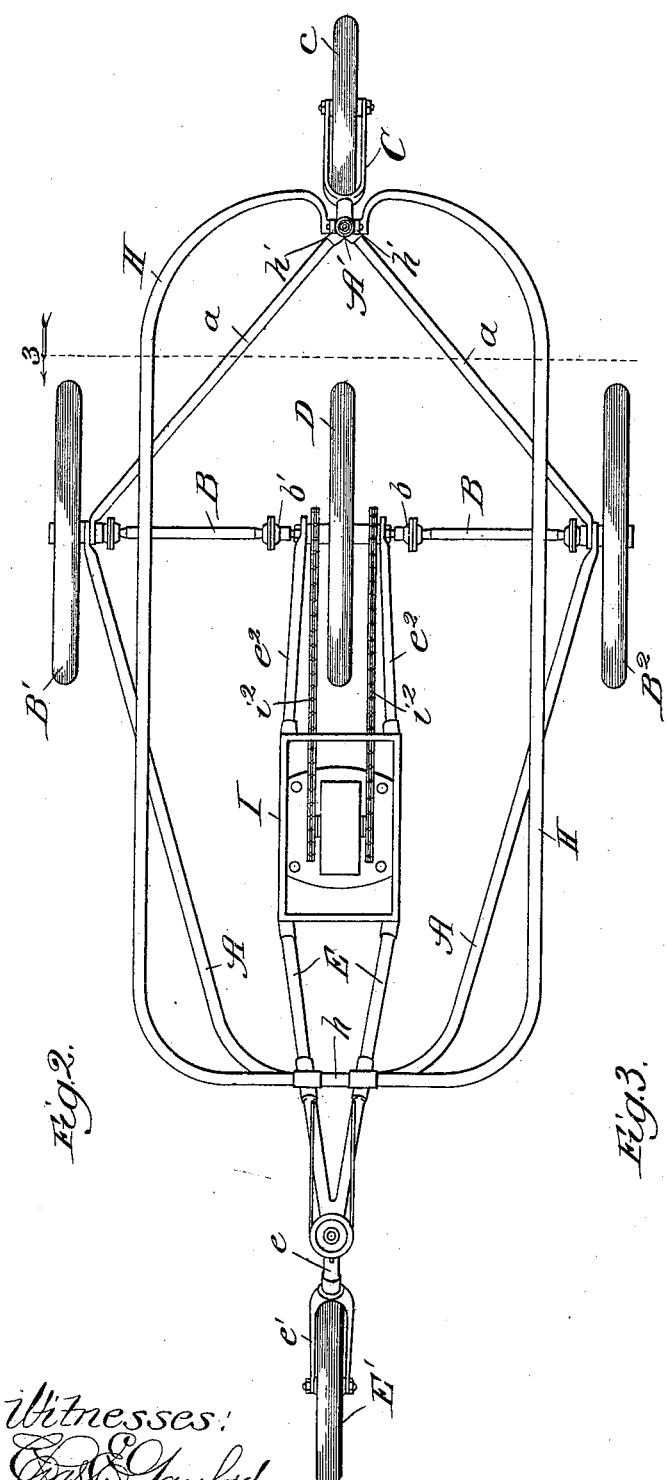
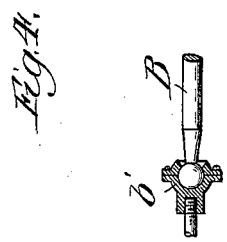
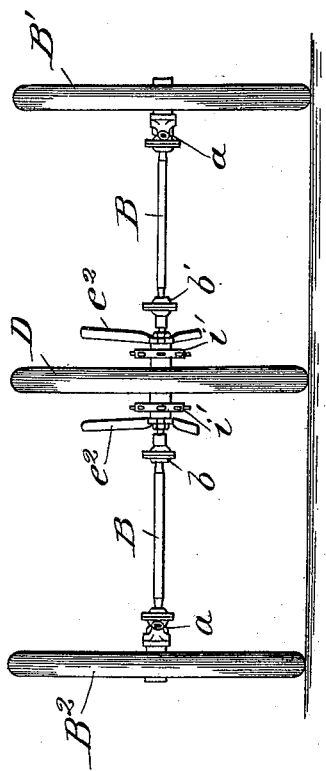
Witnesses:
Inventor:
Bohn C. Hicks,

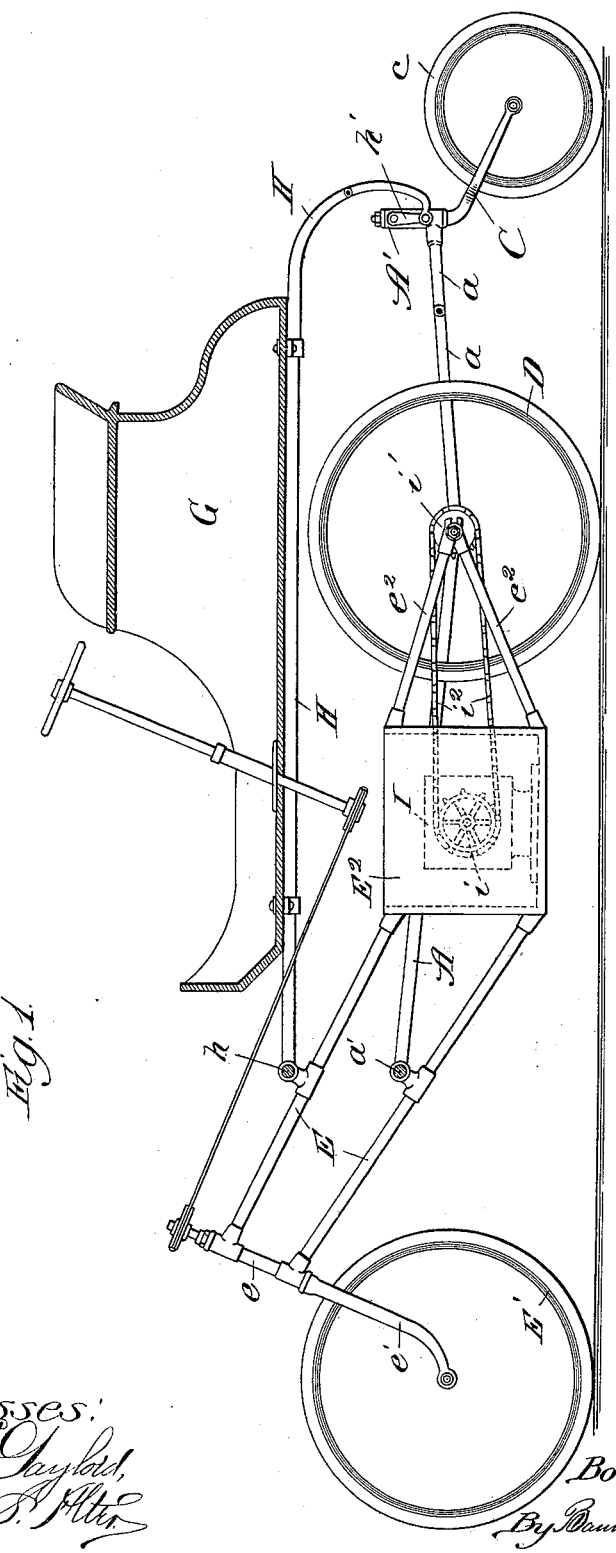

UNITED STATES PATENT OFFICE.

BOHN C. HICKS, OF CHICAGO, ILLINOIS, ASSIGNOR, BY MESNE ASSIGNMENTS, TO THE HICKS MOTOR CYCLE COMPANY, OF ILLINOIS.

VEHICLE.

SPECIFICATION forming part of Letters Patent No. 621,083, dated March 14, 1899.

Application filed August 8, 1898. Serial No. 688,101. (No model.)

*To all whom it may concern:*

Be it known that I, BOHN CHAPIN HICKS, a citizen of the United States, residing at Chicago, Illinois, have invented certain new and useful Improvements in Vehicles, of which the following is a specification.

My invention, broadly speaking, relates to vehicles for use on the common wagon-roads of the country, and particularly to that class of vehicles known as "automobile" vehicles—vehicles propelled by a prime mover, such as a steam-engine, electric battery and motor, and fuel-engine.

The invention relates, further, to a vehicle provided with means for minimizing the shock and jars incident to undulations and obstructions on the common roads.

The object of my invention is to provide a simple, economical, and efficient vehicle.

A further object is to provide a simple, economical, and efficient vehicle with means by which the shocks due to undulations and obstructions of the road are minimized or obviated; and the invention consists in the features, combinations, and details of construction hereinafter described and claimed.

In the accompanying drawings, Figure 1 is a side elevation of a vehicle constructed in accordance with my improvement; Fig. 2, a plan view of the same with the wagon-body removed; Fig. 3, a cross-sectional view taken on line 3 of Fig. 2; and Fig. 4, an enlarged detail view, hereinafter described.

In constructing a vehicle in accordance with my improvements I make the frame of the vehicle as a compound frame, in which there is a main frame A, composed of tubular members, in which the main axle B is rotatably mounted. This main axle is made in several sections connected together by means of universal joints $b$ and $b'$, so that the side wheels B and B', which are rotatably mounted thereon, may have independent vertical movements. This main frame has rods or tubular members $a$, running back and connecting with a rear head-block A' in a V-shaped manner. In this rear head-block a fork C is pivotally mounted, carrying a rear trailing wheel $c$, which assists in supporting the vehicle and at the same time permits it to take curves or rise over obstructions, the tubular members being pivotally connected to the main shaft or axle.

To propel the vehicle, a central driving-wheel D is provided and rotatably mounted on the main axle in parallelism with the two sets of supporting-wheels B and B', and in order to support the prime mover a motor-supporting frame E is provided, composed of tubular members, the front portion of which is provided with a head-block $e$, in which is rotatably mounted a steering-fork $e'$, carrying the steering-wheel E'. This steering-wheel is connected with the motor-frame, and such motor-frame is connected with the main axle, so that the front steering-wheel may rise without raising the side supporting and driving wheels from the ground. The main frame A is also pivotally mounted on the motor-frame at $a'$, so that the rear and side wheels may have independent vertical movements without disturbing the motor-frame in any particular way.

To support the wagon-body G, a body-frame H is provided and pivotally secured to the motor-frame at $h$ and to the rear head by means of the links $h'$, so that such wagon-body is not in any objectionable manner raised or lowered when the individual wheels are raised or lowered, or, in other words, the shocks incident to riding over undulations or obstructions in the road are minimized by means of the different frames.

The motor-frame may be made of tubular members E, brazed to the metal box $E^2$, as shown in the drawings, and with secondary members $e^2$, brazed to such metal box and running to the main axle, or these tubes may be made in one continuous piece and the box dispensed with, as may seem desirable or necessary. The metal box may be supplied with an electric motor I, if desirable or necessary, having sprocket-wheels $i$ on the armature-shaft, connected with sprockets $i'$ on the main shaft by means of a belt $i^2$, or any other suitable motor may be connected thereto. This forms no part of the invention, however, and as a consequence I will merely illustrate it in diagrammatic form and describe it generally.

I claim—

1. In a vehicle of the class described, the combination of a frame portion provided with three wheels arranged parallel to each other and mounted upon a flexible shaft, the center wheel being the driving-wheel, so that the wheels may have independent vertical movements, substantially as described.

2. In a vehicle of the class described, the combination of a main shaft made in two or more parts flexibly connected together, a driving-wheel at the central portion thereof, a supporting-wheel at or near each end of the shaft, a main frame connected with the main shaft and pivotally connected to a front steering wheel or wheels, and a front steering wheel or wheels, substantially as described.

3. In a vehicle of the class described, the combination of a main shaft or axle made in two or more sections secured together with universal joints, a main driving-wheel arranged at the central portion thereof, a supporting-wheel at each end of such shaft arranged parallel with each other and with the central driving-wheel, a front steering wheel or wheels, a motor-frame connected with the front steering-wheel and with the main axle, and a main frame pivotally connected with the motor-frame, and connected with the main axle, substantially as described.

4. In a vehicle of the class described, the combination of a main shaft or axle made in two or more sections pivotally connected together, a central driving-wheel on such axle, a supporting-wheel at or near each end of such axle arranged parallel with each other and with the central driving-wheel, a front steering wheel or wheels, a frame connecting the front steering-wheels and axle together, a main frame pivotally connected to the first-named frame and to the main axle, a rear trailing wheel, a rear head-block for such rear trailing wheel, and a frame portion connecting the rear head-block with the main axle, substantially as described.

5. In a vehicle of the class described, the combination of a main shaft or axle made in two or more sections pivotally connected together, a driving-wheel arranged at the central portion thereof, a supporting-wheel arranged at or near each end of the axle parallel with each other and with the central driving-wheel, a front steering-wheel, a frame connecting the front steering-wheel with the main axle, a main frame pivotally connected to the first-named frame and connected with the axle, a rear trailing wheel, a rear head-block in which such trailing wheel is pivotally mounted, a frame portion connecting the rear head-block with the main axle, a body-frame pivotally connected to the first-named frame and with the rear head-block, and a wagon-body on such body-frame, substantially as described.

BOHN C. HICKS.

Witnesses:
THOMAS F. SHERIDAN,
THOMAS B. McGREGOR.